(No Model.)
H. D. WOLCOTT.
SAW JOINTER.
No. 298,538. Patented May 13, 1884.
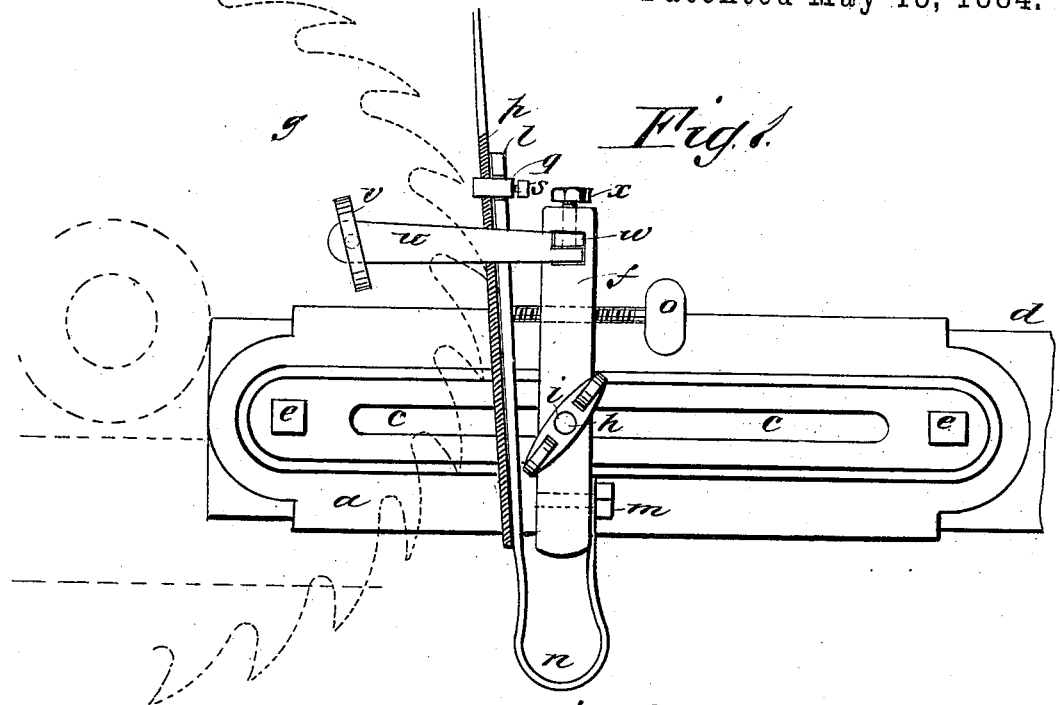
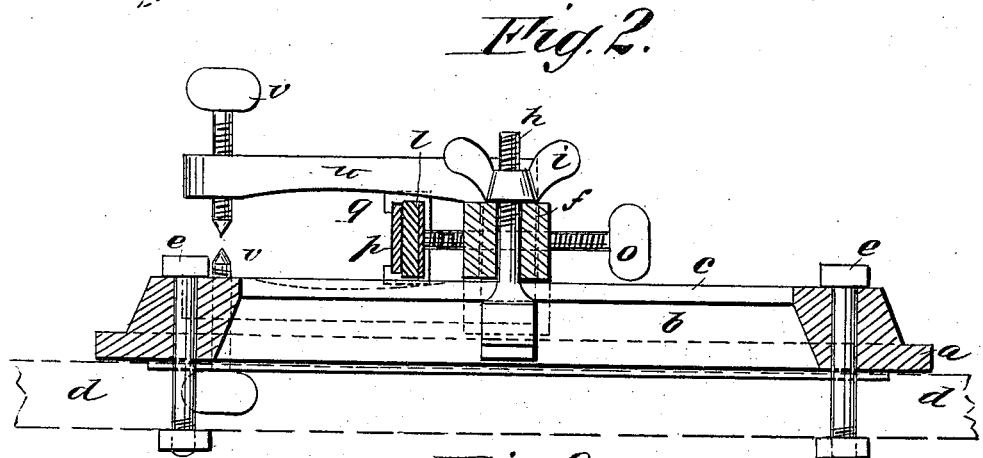
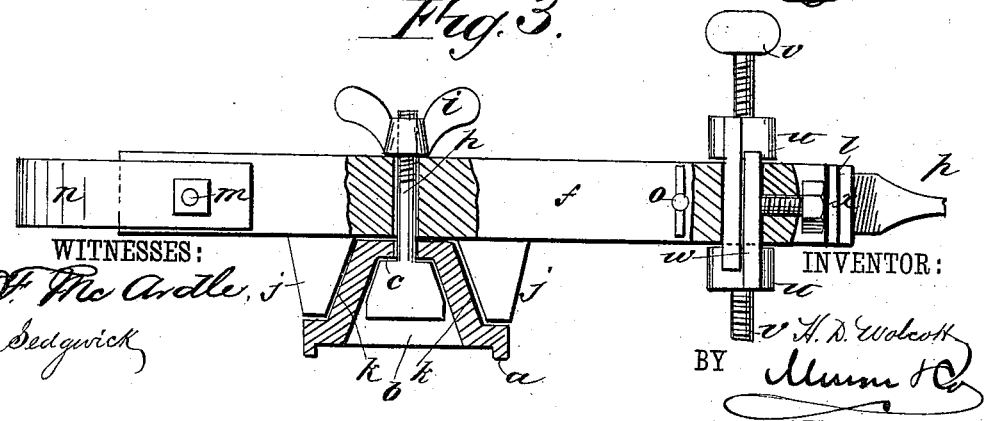
WITNESSES:
F. McArdle
C. Sedgwick
INVENTOR:
H. D. Wolcott
BY Munn & Co.
ATTORNEYS.

UNITED STATES PATENT OFFICE.

HYMAN D. WOLCOTT, OF WRIGHT'S, ASSIGNOR OF ONE-HALF TO HORACE J. WOLCOTT, OF PORT ALLEGANY, PENNSYLVANIA.

SAW-JOINTER.

SPECIFICATION forming part of Letters Patent No. 298,538, dated May 13, 1884.

Application filed December 10, 1883. (No model.)

*To all whom it may concern:*

Be it known that I, HYMAN D. WOLCOTT, of Wright's, in the county of McKean and state of Pennsylvania, have invented a new and Improved Circular-Saw Jointer, of which the following is a full, clear, and exact description.

My invention consists of a file-holding plate having a clamp adapted to attach a file, so as to hold the file in front of the points of the teeth of a circular saw, said plate being connected to a supporting-stock for holding it, and provided with an adjusting-screw by which the file may be set up to the points of the teeth of the saw, and they are dressed off by running the saw-teeth against the file. The stock for holding the file-plate is adjustably fitted to a bed-piece that is bolted to the filing-bench suitably for mounting the file-plate with relation to the saw as required, and said stock has guides to steady the saw laterally also, to cause it to run to one side or the other, in case it may be desired to dress the teeth more to one side than the other, to correct any tendency of the saw to run out of line in the log, all as hereinafter fully described.

Reference is to be had to the accompanying drawings, forming part of this specification, in which similar letters of reference indicate corresponding parts in all the figures.

Figure 1 is a side elevation of my improved circular-saw jointer and part of a saw, the latter being represented in dotted lines. Fig. 2 is a horizontal section of the jointer; and Fig. 3 is an elevation of the file-holding stock and section through the base-plate, parts being broken away to show details.

I make a base-plate, $a$, with a deep groove, $b$, in the back, and a slot, $c$, through the front, to bolt on the side of the filing-bench $d$ by bolts $e$ through the ends of said plate for holding the file and guide-supporting stock $f$ in front of the saw $g$ to be jointed, said stock $f$ being clamped against the front side of said base-plate $a$ by the bolt $h$ and the thumb $i$, and having guide-lugs $j$, bearing against the upper and lower edges, $k$, of the base-plate, which are beveled so that the guide-lugs, being correspondingly beveled, will draw snugly onto them when the bolt $h$ is screwed up tight and hold the file-supporting stock up rigidly against back-pressure at the upper end. This supporting-stock may be shifted along the base-plate toward and from the saw as required for adjusting it by slackening the bolt $h$ and shifting it along the groove $b$ and the slot $c$ of the base-plate. The groove $b$ affords the requisite space in the base-plate between the front of said plate and the side of the filing-bench for the head of the bolt $h$, and the side walls of the groove hold the bolt from turning by the friction of the nut. The file-holding plate $l$ is connected to the lower end of the supporting-stock $f$ by the bolt $m$, and has a flexible bow, $n$, projecting below the lower end of the file-stock, to enable the plate to shift to and from the saw $g$; and near the upper end of the stock an adjusting-screw, $o$, is fitted, bearing against the side of the plate, to cause the file $p$ to bear against the points of the teeth with sufficient pressure to dress them off and to set up the file as the points are filed away. The file $p$ is secured to the plate $l$ by a hook-clamp, $q$, and binding-screw $s$. A couple of guide-arms, $u$, with screw saw-guides $v$, are attached to the supporting-stock $f$ near the upper end, for guiding the saw to prevent the saw from wabbling, and also to bear it to one side or the other, as may sometimes be required, to make the teeth slightly shorter on one side than on the other, to correct any tendency of the saw to run out of line in the logs. The screw-guides are adjustable in the guide-arms and the guide-arms are adjustable in the supporting-stock, said arms being connected to the stock by elbows $w$, inserted in a mortise through the stock and overlapping each other therein, so as to be secured in any position by a binding-screw, $x$.

It will be seen that with this simple attachment saws may be quickly and accurately jointed before filing, and the attachment is also an excellent device for holding the saw against the lateral thrusts of the file when filing the saw.

Having thus described my invention, I claim as new and desire to secure by Letters Patent—

1. The improved circular-saw-jointing attachment, consisting of base-plate $a$, supporting-stock $f$, flexibly-connected file-holding plate $l$, attaching-clamp $q$ $s$, and the adjusting-screw $o$, combined and arranged substantially as described.

2. The jointing attachment herein described, consisting of base-plate $a$, supporting-stock $f$, file-holding plate $l$, clamp $q\ s$, and adjusting-screw $o$, combined and arranged substantially as described.

3. The combination, in a circular-saw-jointing attachment, of the base-plate $a$, supporting-stock $f$, file-holding plate $l$, clamp $q\ s$, adjusting-screw $o$, and the guiding-arms $u$ and screw-guides $v$, substantially as described.

4. The guide-arms $u$, having adjusting screw-guides $v$, and connected to the supporting-stock $f$ by the overlapping elbows $w$, fitted in a mortise of the stock and secured by the binding-screw $x$, substantially as described.

HYMAN D. WOLCOTT.

Witnesses:
S. W. SMITH,
MILES IRONS,
W. E. SMITH.